United States Patent Office.

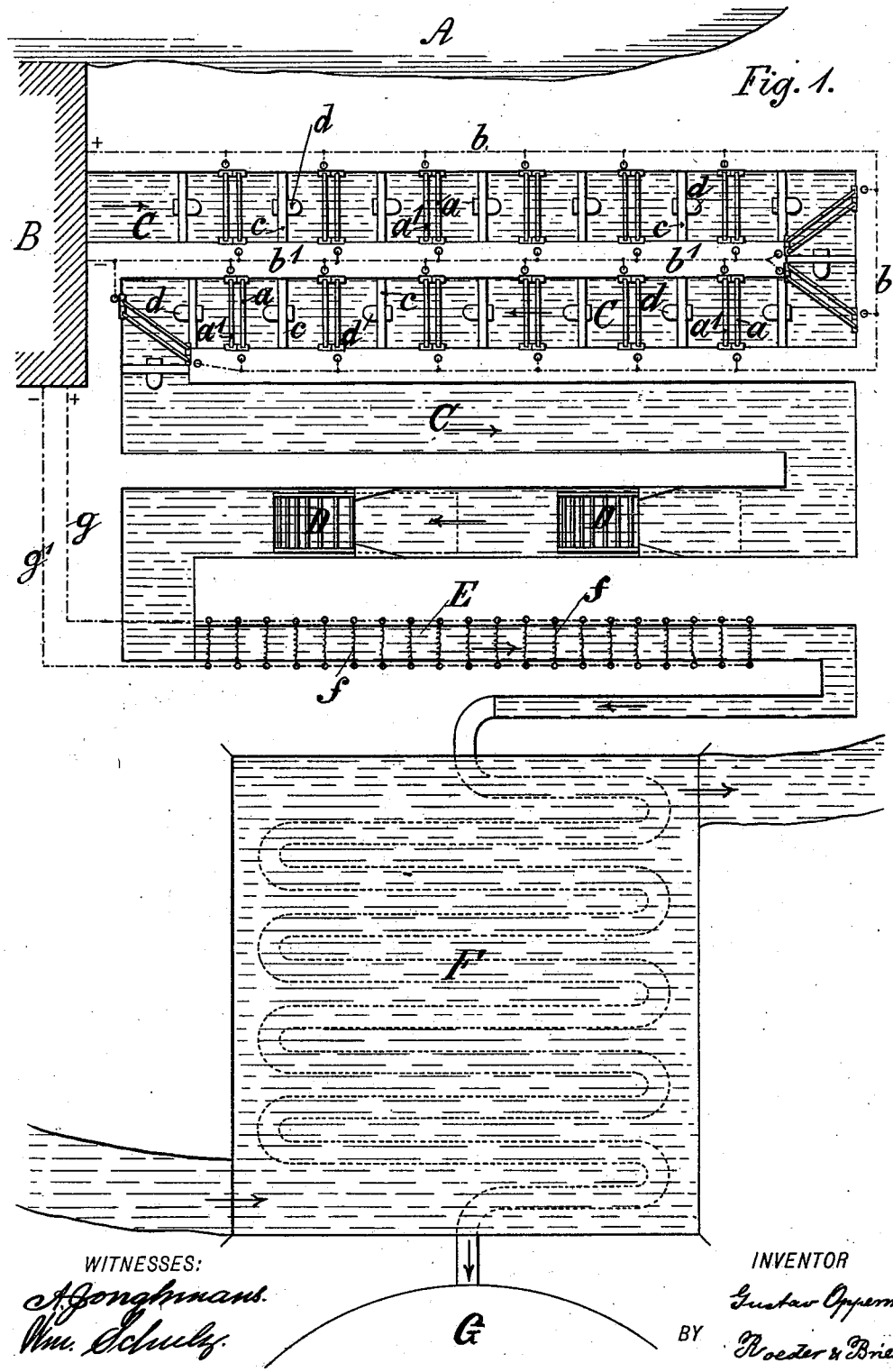

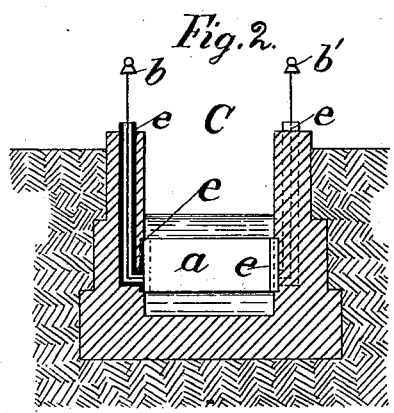
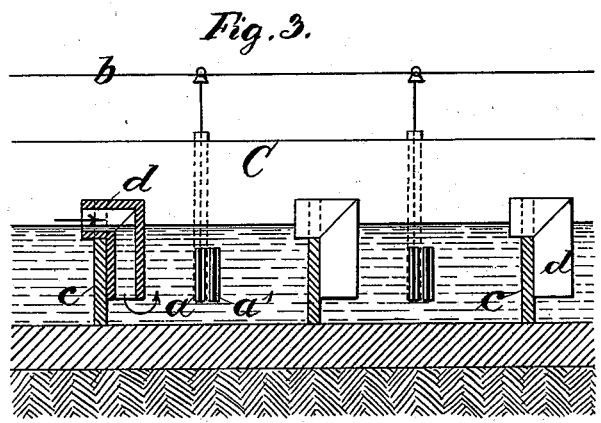
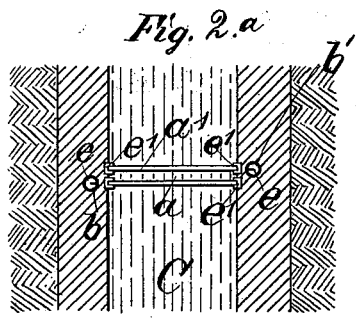
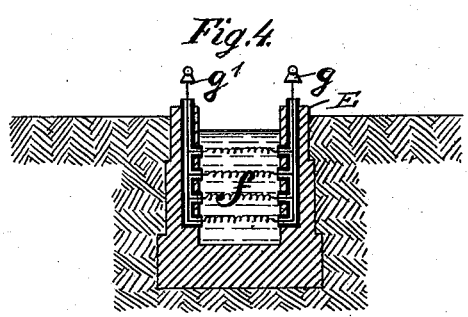
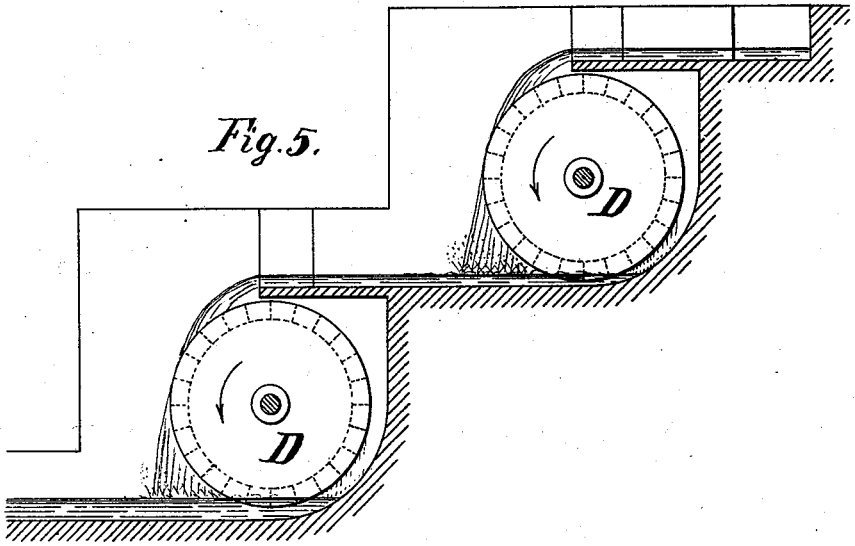

GUSTAV OPPERMANN, OF RÖBEL, GERMANY.

PROCESS OF AND APPARATUS FOR PURIFYING WATER.

SPECIFICATION forming part of Letters Patent No. 506,248, dated October 10, 1893.

Application filed March 28, 1893. Serial No. 467,932. (No model.)

*To all whom it may concern:*

Be it known that I, GUSTAV OPPERMANN, a subject of the Grand Duke of Mecklenburg, residing at Röbel, in the Grand Duchy of Mecklenburg, German Empire, have invented a new and Improved Process and Apparatus for Purifying Water, of which the following is a specification.

It is a well recognized fact that the gaseous chemical combinations, among which ozone and peroxide of hydrogen seem to hold a first rank and which are formed by electrolyzing water, act highly oxidizing and therefore in a destructive way upon organic matter carried by water. Experiments in laboratories relative to this fact have been made upon a small scale, and proved that in fact the electrolysis of water gave a purifying result.

It is the object of this invention to provide means for making use of the electric current for purifying water supplied to cities or on a large scale.

In the accompanying drawings: Figure 1 is a vertical longitudinal section of my improved apparatus for purifying water. Fig. 2 is a cross section through channel C; Fig. 2$^a$, a horizontal section through part of the same; Fig. 3, a detail longitudinal section through the channel; Fig. 4, a cross section through the gutter E, and Fig. 5 a longitudinal section through the mechanical agitators D.

The water which has to be supplied by a natural flow A, or basin is conveyed, when required, by a pump B, through a narrow sinuous channel C, in which a series of electrodes $a$, $a'$, arranged in pairs are situated and connected to the circuit of a current. The water will be subject to electrolysis when flowing between each couple of electrodes and in consequence dissolve or absorb large quantities of ozone and peroxide of hydrogen. These decomposing gases will destroy the bacteria and products of putrification in the water.

The feature of conveying the water through a relatively narrow channel dispenses with the necessity of employing large and very expensive plates of platina, because sheets of thin platina will be sufficient in narrow channels which otherwise would not offer the required resistance.

As to the special arrangement of the channel with its fittings, it must be made of ordinary bricks in cement, mortar and lined inside with cement. The channel is to be built in crankles or sinuosities as before stated.

In order to prevent the water from flowing too rapidly through the channel, it is desirable to divide the latter into compartments at distances of say three to four and one-half inches by mured partitions $c$ of half the height of the walls of the channel and to let the water flow through clay pipes $d$, from one compartment into the other.

The wires $b\ b'$ which are to be connected to the electrodes are cemented in glass tubes $e$, and put with these in the walls of the channel Fig. 2$^a$. Each end of a wire made of platina upon leaving the bottom of a glass tube is soldered to its electrode. The wire leaving the top of the glass tube is wound around an insulator and conveyed to the next electrode. Each plate of electrode has at both sides, narrow glass bands $e'$, by means of which the plate is fixed in the walls of the channel. The water pipes $d$, nearly touch the bottom of the channel, so that the water rises uniformly and smoothly between the two electrodes of each compartment of the channel. The channel is left open above, to allow an easy escape to the waste gases developed by the electrolysis. In order to protect the entire construction against the weather and climate, it is covered with a roof of paste board, or brought within a building, which allows the gases to escape freely.

After the decomposing gases have been absorbed by the water and disinfection has set in within the channel C, the electrolyzed water is caused to flow over waterwheels D, to be erected behind the compartments of the electrodes. This operation thoroughly mingles mechanically the particles of water and the smallest living organism still contained therein with the decomposing gases absorbed by it and brings them into an intimate contact with each other. Instead of waterwheels, other mixers with large distributing contact surfaces may be used. If it were practicable to leave for a certain time, the thus treated water to itself (say eight to ten days in winter) in order to permit the excess of ozone to escape, a complete destruction of all microorganisms by electricity would be possible and a further proceeding be not necessary. However, it is scarcely practicable for a large water-work, to keep filled basins untouched for a time sufficient for the electrolyzed water to get rid of its excess of ozone. This would involve a great extension of the construction, and in consequence considerably increase the first cost. Time therefore must be saved in which the electrolyzed water is made ready for use, if the entire practical value of the process is not to be destroyed. Beyond this, the electrolysis does not give an absolute guarantee that all the pernicious matter is destroyed. For these two reasons the electrolysis is followed by a further treatment based upon the thermic properties of electricity. By heating the water, the process of disinfection is considerably accellerated and at the same time the ozone is expelled from the water. To carry on this thermic treatment I place behind the waterwheels D, a gutter E, in which the water has to pass a number of spirals $f$. These spirals are by wires $g$, $g'$, connected to the circuit of a current, in a similar manner as the electrodes $a$, $a'$. The electric current heats the water passing through the gutter and expels the excess of ozone. Besides, the heat acts destructively upon the organic parts, left vital within the water. Finally the water is conveyed through a cooling basin F, before it enters the clearing basins G, or reaches the sand filters. Here the killed organisms are mechanically separated from the water and the latter is then ready for use.

In the described manner of practical operation, the process offers the security of obtaining in a short time and at a small expense, a quite pure and germless water that answers the severest tests of hygiene, and may be used for the interior and exterior without danger of infection.

What I claim is—

1. The combination of channel C with electrodes within the channel, a mechanical mixer in the rear of the electrodes, heating wires in the rear of the mixer and a terminal cooling basin, substantially as specified.

2. The process of purifying water which consists in successively electrolyzing, agitating and heating it, substantially as specified.

Signed at Lubeck, Germany, this 14th day of March, 1893.

GUSTAV OPPERMANN.

Witnesses:
CARL OLDART,
ROBERT MICHELSEN.